United States Patent
Braun

(10) Patent No.: US 7,023,470 B2
(45) Date of Patent: Apr. 4, 2006

(54) SELF-TESTING VIDEO DISPLAY DEVICES AND METHOD OF USE THEREOF

(75) Inventor: David A. Braun, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 915 days.

(21) Appl. No.: 10/050,917

(22) Filed: Jan. 22, 2002

(65) Prior Publication Data

US 2003/0137587 A1    Jul. 24, 2003

(51) Int. Cl.
*H04N 17/00*   (2006.01)
*H04N 17/02*   (2006.01)

(52) U.S. Cl. .................. 348/180; 348/181; 348/182; 348/184; 348/117

(58) Field of Classification Search ............. 348/180, 348/181, 182, 184, 185, 189, 190, 191, 177; 345/10, 12, 13, 14; 725/107, 109, 110
See application file for complete search history.

(56) References Cited

U.S. PATENT DOCUMENTS

| | | | |
|---|---|---|---|
| 5,298,993 A * | 3/1994 | Edgar et al. ............... 348/180 |
| 5,351,201 A | 9/1994 | Harshbarger, Jr. et al. ....... 364/551.01 |
| 5,537,145 A | 7/1996 | Miseli ........................ 348/181 |
| 5,670,972 A * | 9/1997 | Kim ............................ 345/13 |
| 5,671,011 A | 9/1997 | Kim ............................ 348/189 |
| 5,732,212 A * | 3/1998 | Perholtz et al. ............. 709/224 |
| 5,874,991 A | 2/1999 | Steinberg et al. ........... 348/181 |
| 5,881,221 A * | 3/1999 | Hoang et al. ................. 714/42 |
| 5,920,340 A | 7/1999 | Man et al. .................... 348/181 |
| 5,969,756 A | 10/1999 | Buckley et al. ............. 348/190 |
| RE36,368 E * | 11/1999 | Johnson et al. ............... 348/10 |
| 5,999,148 A * | 12/1999 | Park ............................. 345/10 |
| 6,252,626 B1 | 6/2001 | Buckley et al. ............. 348/189 |
| 6,285,395 B1 | 9/2001 | Firpo ........................ 348/144 |
| 6,326,996 B1 * | 12/2001 | Brabander .................... 348/189 |
| 6,380,971 B1 * | 4/2002 | Brodigan .................... 348/180 |
| 6,643,798 B1 * | 11/2003 | Barton et al. ................. 714/25 |
| 6,741,277 B1 * | 5/2004 | Rau ........................... 348/181 |

* cited by examiner

*Primary Examiner*—John Miller
*Assistant Examiner*—Jean W. Désir
(74) *Attorney, Agent, or Firm*—Richard P. Lange

(57) ABSTRACT

A self-testing video display device and method of use. A video display test program is stored in a video processing unit inside a video display device. The test program includes a plurality of video test patterns and is accessible by entering a "secret" keycode combination on a keypad of the video display device. The self-testing video display device allows a service center operator to evaluate a malfunctioned video display device at the user's location through telephone or internet. An end user may also use the video display test process to set up, evaluate, and calibrate the self-testing video display device at the user's location.

21 Claims, 4 Drawing Sheets

SELF-TESTING VIDEO DISPLAY DEVICES AND METHOD OF USE THEREOF

BACKGROUND

1. Technical Field

The technical field generally is the test of video display devices and particularly is the creation of a plurality of test patterns by a video processing unit inside a video display device.

2. Description of Related Art

Video display devices are utilized in a variety of applications within many fields of technology, which range from TV, video games, and computers, to the display of data for monitoring various occurrences or events within different environments, e.g. machining, robotics, aircraft instrument display, computer simulation and analysis, nuclear power plant monitoring and regulation, and the like.

The most commonly used video display device is a Cathode Ray Tube (CRT). The CRT uses a special-purpose electron tube in which electrons are accelerated by high-voltage anodes, formed into a beam by focusing electrodes, and projected toward a phosphorescent screen that forms one face of the tube. The CRT devices, however, are gradually being replaced by thin flat panel display devices such as liquid crystal displays (LCD), which are thinner and lighter than the CRT and therefore can be used in almost any space.

LCD devices use the property of varying light transmittance according to the level of voltage applied to the liquid crystal to display images. LCD devices have the advantage of requiring a lower voltage than that required by other types of displays. In recent years color televisions and computer monitors featuring LCD screens have become practical. LCD-based color panels typically consist of a quartz substrate having a matrix of thin film transistors (TFT) made from polycrystalline silicon, and an LCD substrate which is constructed by laminating a transparent filter glass substrate on top of the quartz substrate and sealing liquid crystal in the small gap between the quartz substrate and the glass plate. The functional characteristic of the LCD is a twisted nematic mode. For imaging applications, the active-matrix driven display circuit arrangement is advantageous because of its adaptability to large area devices and to a high density of pixels and other circuit components. Practical applications have been implemented starting with relatively small display devices.

A number of new display technologies, such as plasma, fluorescent, and organic light emitting display (OLED) devices, are currently under development and have been used in head mounted or eyeglass display devices.

The basic functions of a video display device can be tested by visual inspection of various display patterns, created to reveal possible problems. For example, convergence of red, green, and blue primaries in a color CRT can be evaluated by the position of the separate red, green, and blue dots or pixels. Other commonly tested display functions include: geometry and distortion, sharpness and resolution, screen pixel resolution, color and gray-scale, and other miscellaneous effects such as interference, interlace, and flicker.

The visual testing is usually performed at the manufacturing and repairing facilities using video generators that provide test signals and patterns. These signals and patterns are constituted in a rather complex manner with a multiplicity of test stimuli in order to make transmission of the test information most efficient and to make visual observation and evaluation as rapid as possible. Recently, software programs, such as DisplayMate (product of DisplayMate Technologies Corp., PO Box 550, Amherst, N.H. 03031) have been developed for setting up, tuning-up, calibrating, evaluating and testing video display devices at a user's location. In these cases, however, the test signals are produced from an outside source (e.g., a video generator or a computer).

U.S. Pat. No. 5,671,011 to Soon-doo Kim, which is incorporated herein by reference, describes a test pattern display apparatus and method for adjusting the display parameters of a television picture. The test pattern is stored in a font memory and can be internally generated and displayed as needed. The apparatus, however, is designed for testing traditional black-and-white or color televisions with simple bar-type test patterns.

A very significant percentage of video display devices returned for warranty repairs actually have nothing wrong with them at all. The problems that led to their return often reside in other components of the system that generate or supply signals for the video display devices, such as a video graphic card in a PC system. These "wrongfully" diagnosed devices increase the warranty cost for the manufacturers, tie up the inventory, and also cause a lot of aggravation for the customers. In addition, an end user of a video display device may need to adjust the quality of the display at user's location from time to time.

Therefore, a need exists for a method and apparatus for testing a video display device at end user's location without any additional equipment.

SUMMARY

An advantage of the present invention is that it overcomes the disadvantages of the prior art. An embodiment provides a method for testing a video display device by storing a video test program containing a plurality of test patterns in a video processing unit inside the video display device. An advantage of an embodiment is that the test program is accessible by entering a "secret" keycode from a keypad of the video display device. In an embodiment, a customer service representative at a technical support center may instruct an end user how to pull up the test patterns over the telephone or via Internet and perform base-level diagnostics to determine if there is a problem with the monitor or with the external signal source. An embodiment enables a technician at a retail outlet to test the device without using an expensive signal generator. Another embodiment enables an end user to use the test patterns to set up, calibrate, and evaluate a video display device at any location.

These and other advantages are achieved by a self-testing video display device that contains a keypad, a video display screen, a memory that stores information for a test program, a processor that extracts the test program information and executes the test program, and a controller that sends test signals in a proper format to the video display screen.

These and other advantages are also achieved by methods for determining a functionality of a self-testing video display device. One method includes the steps of: receiving a request for testing from an end user at a remote site, providing an access code to the end user to initiate a video display test on a self-testing video display device, receiving reports from the end user, and diagnosing a functionality of the video display device based on the reports received from the end user. Another method includes the steps of: contacting a service center to receive a test code, entering the test code from a keypad on a video display device to initiate a visual test that displays a plurality of video display test patterns on a video display screen using information stored inside the video display device, examining each video display test pattern to generate an evaluation; reporting the evaluation to the service center, and receiving a diagnosis from the service center.

BRIEF DESCRIPTION OF THE DRAWINGS

The detailed description will refer to the following drawings, in which like numerals refer to like elements, and in which.

DETAILED DESCRIPTION

Figure 1:
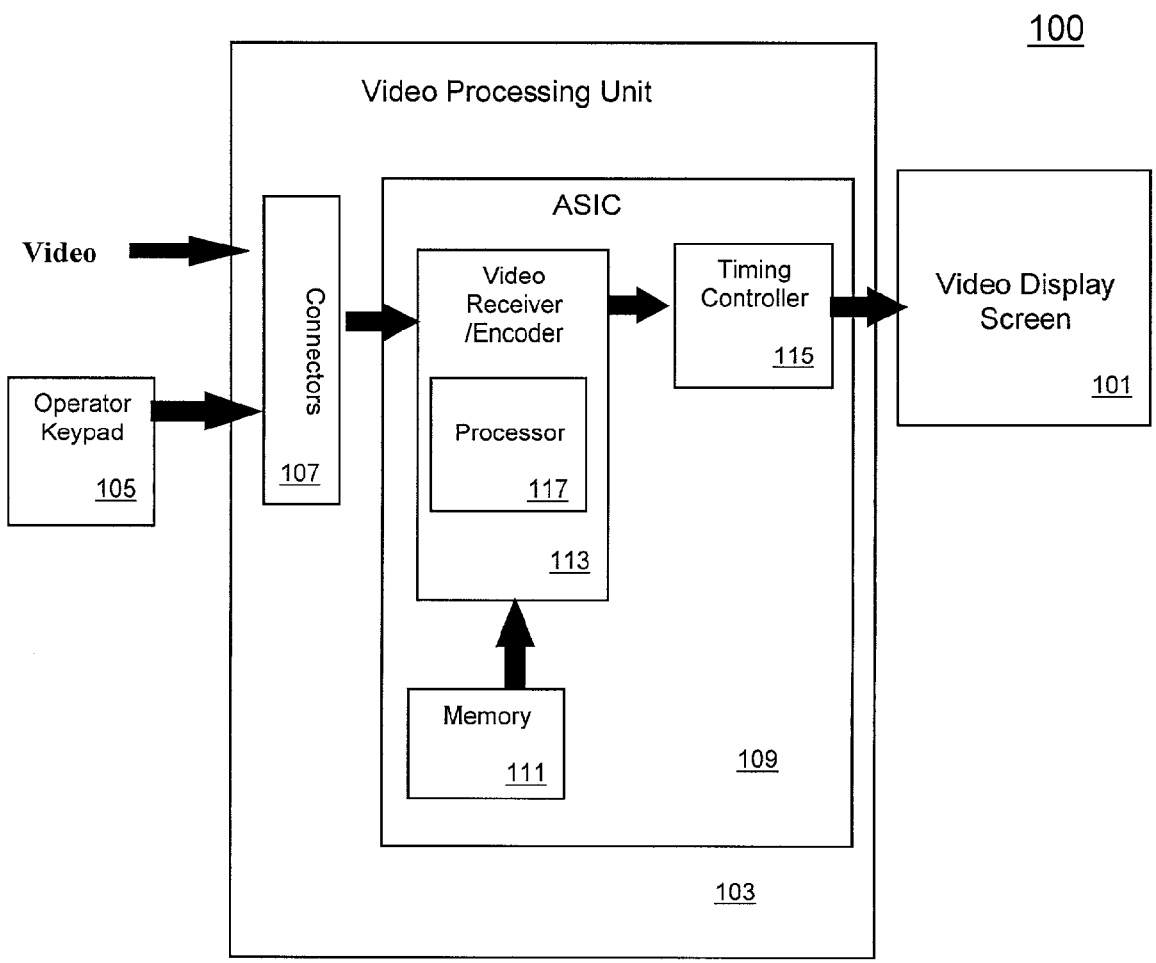
FIG. 1 depicts an embodiment of a self-testing video display device.

FIG. 1 illustrates a self-testing video display device 100 according to one embodiment of the present invention. The video display screen under evaluation 101 may be any kind of electronic video display screen, such as CRT, LCD, OLED, fluorescent, plasma, or the like. Coupled to video display screen 101 is a video processing unit 103, that serves as a test pattern generator, and a keypad 105. In this embodiment, the keypad 105 includes standard brightness/contrast adjustment buttons located on the front panel of most commercially available video monitors. However, the keypad 105 may contain any number of keys and may be placed in any other suitable place of the video display device 100.

The video processing unit 103 may comprise an application specific integrated circuit (ASIC) 109 and optional connectors 107. The connectors 107 receive incoming signals such as video signals or keypad signals, and deliver the signals to the ASIC 109. Alternatively, incoming signals may be delivered directly to the ASIC 109. The ASIC 109 preferably includes a memory 111, a video receiver/encoder 113 and a timing controller 115.

The memory 111 may be any type of memory such as, for example, a read only memory (ROM), dynamic random access memory (DRAM), static random access memory (SRAM), video random access memory (VRAM) and the like. The memory 111 provides temporary and permanent storage of information for a video display test program that may include various types of test patterns such as general test patterns suitable for many types of video display device or specific test patterns designed for certain types of video display devices, and instructions on how to execute the test program. The memory 111 may also provide storage of information for a diagnostic progcedure that can be used to determine the functionality of the other components of the system e.g., the video graphic card.

The video receiver/encoder 113 preferably includes a processor 117 that performs a variety of operations including execution of the test program or diagnostic procedure stored in the memory 111 and generation of video data signals. The video receiver/encoder 113 converts the data signal into a proper format and sends the converted data to the timing controller 115. The timing controller 115 transforms the converted data signals into corresponding video signals having coherent timing relationships to drive the video display screen 101.

A test process may be initiated by entering a secret code on the keypad 105, for example, by pressing both "up" and "down" buttons of the brightness control on the front panel of a video monitor. The video receiver/encoder 113, upon receiving the secret code through connectors 107, retrieves the test patterns from memory 111, converts the data into the proper format, and sends the converted test pattern signals to the video display screen 101 through the timing controller 115.

Figure 2:
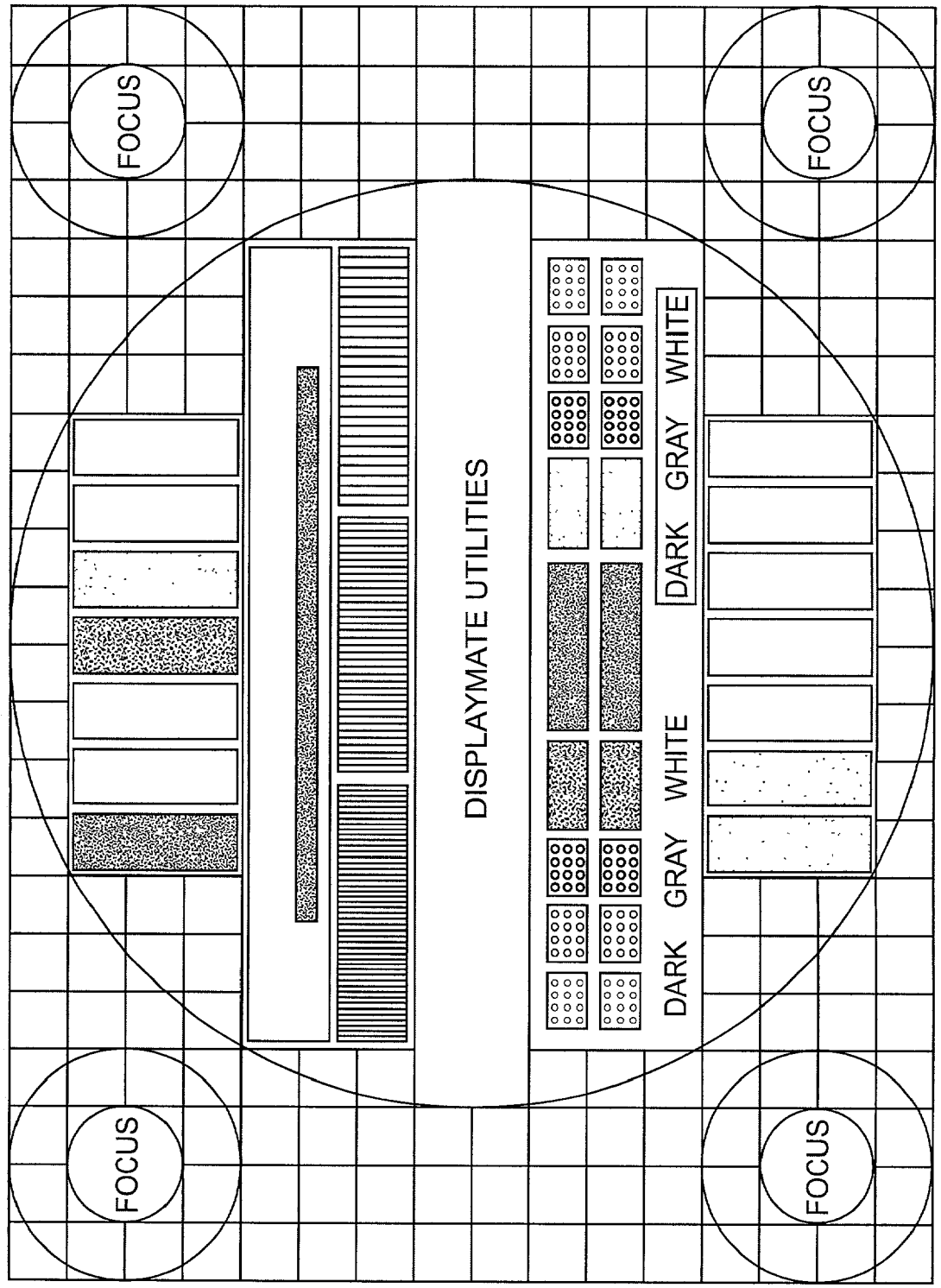
FIG. 2 is an example of a video display test pattern.

FIG. 2 is an example of a video test pattern 200 (Copyright© 2001 by DisplayMate Technology Corp.). The pattern 200 is a "master" pattern in that it can be used to examine a variety of video performance parameters including color, gray scaling, resolution and, more specifically for CRTs, focus and convergence. Although appearing in black and white in FIG. 2, the test pattern may include colored versions. Depending on the type of video display screen under test, different test patterns may be used to address the specific characteristics of the video display screen. The commonly tested parameters include, but are not limited to:

1. Brightness: brightness is the intensity of light emitted from the display surface.
2. Contrast: contrast is the ratio of the light emitted in light areas versus dark areas of the display. It should be noted that brightness and contrast are integrally important to visual acuity.
3. Black Level: black level is the threshold at which light is emitted from the display surface sufficiently to just be visible. Black level is a component of contrast.
4. Color Fidelity: color fidelity is the generation of the desired color on the display surface, and includes uniformity, fringing, registration, convergence, and all other color related matters.
5. Uniformity: uniformity is the consistency of brightness generated from various areas on the display surface.
6. Size: size is the stability of height and width of the image area.
7. Centering: centering is the stability of position of the image area on the display surface.
8. Geometry: geometry is the proportioning of the displayed image, including linearity and other distortions.
9. Lag: lag is the time required for build-up or decay of a change in brightness. Degradation of this parameter may result in flicker (lag too short) or image smearing (lag too long), either of which impede the ability to recognize the information.
10. Focus: focus is the setting of CRT operating conditions for maximum sharpness of the image on the display surface.
11. Resolution: resolution is the ability of the display to exhibit fine detail information. Degradation of resolution results in loss of image clarity. For LCD devices, the following parameters may also be tested:
12. Image Storage or Retention: image storage or retention is essentially the same effect as Lag in CRTs and various light sensing devices. Image retention is known to decrease image contrast ratio in any change of scene.
13. Directivity: directivity is the change in display brightness or contrast as the viewing angle varies, and is a component of Brightness and Contrast.
14. Background Light: background light is the background illumination required to create the image in a transmissive device such as a LCD. As the background illumination is a function of the light source, it may degrade with time and temperature.
15. Light Scatter: light scatter is the scattering of light among individual image elements (or pixels) due to the discrete nature of the elements, as opposed to the continuous surface of a CRT. This is a contributor to the Brightness and Contrast parameters.

16. Timing: timing relates to the proper mapping of analog signals on a digital display. Timing usually includes clock and phase adjustment.

Figure 3:
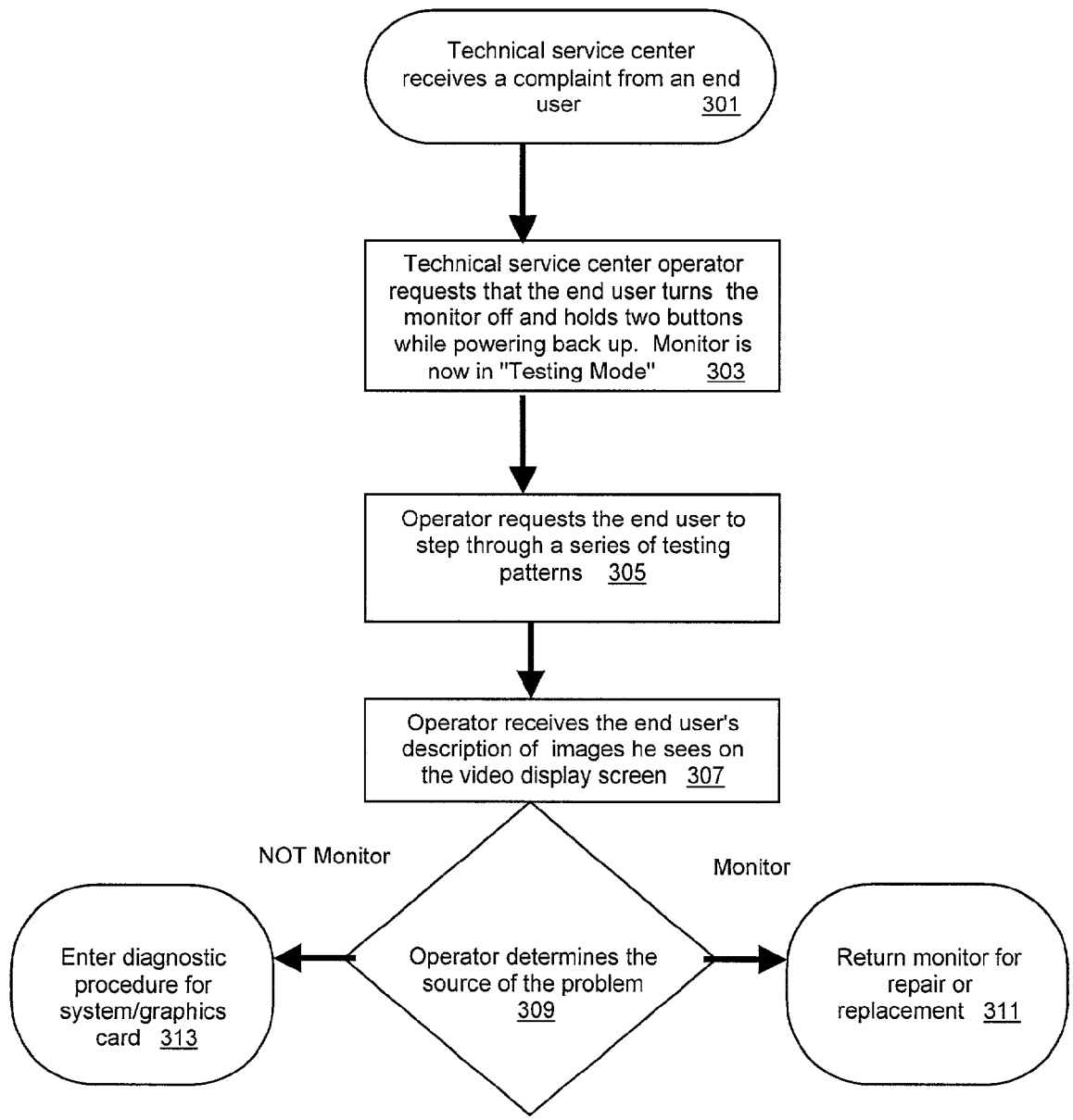
FIG. 3 is a flowchart outlining the operational steps of a video display test process.

An embodiment of a method 300 for testing a video display device is illustrated in FIG. 3. When a technical service center receives (301) a call from an end user with a complaint of "blank display" on a video display device such as a PC monitor, the technical service center operator requests (303) that the end user turn the monitor off and hold two buttons on the front panel (e.g., both "up" and "down" buttons for brightness) while powering back up. The monitor is now in the "testing mode." The operator then requests (305) that the end user step through a series of video test patterns by pressing certain buttons on the front panel. Each video test pattern may be preceded by a display of a brief description about how to properly examine the following test pattern. Alternatively, the brief description may be included in each video test pattern. The operator receives (307) the end user's description of images that he/she sees on the video display screen. Based on this description and feedback from the end user, the operator determines (309) the source of the problem. If the operator decides that the problem is in the monitor itself, the operator will ask the end user to return (311) the monitor for repair or replacement. On the other hand, if the operator decides that the problem is not the monitor but due to other parts of the system, e.g., the video graphic card, he will ask the end user to initiate (313) a diagnostic procedure designed to locate the source of the problem. Alternatively, the diagnostic procedure may be initiated automatically after the video pattern test. Information for the diagnostic procedure may be stored in the memory 111.

Figure 4:
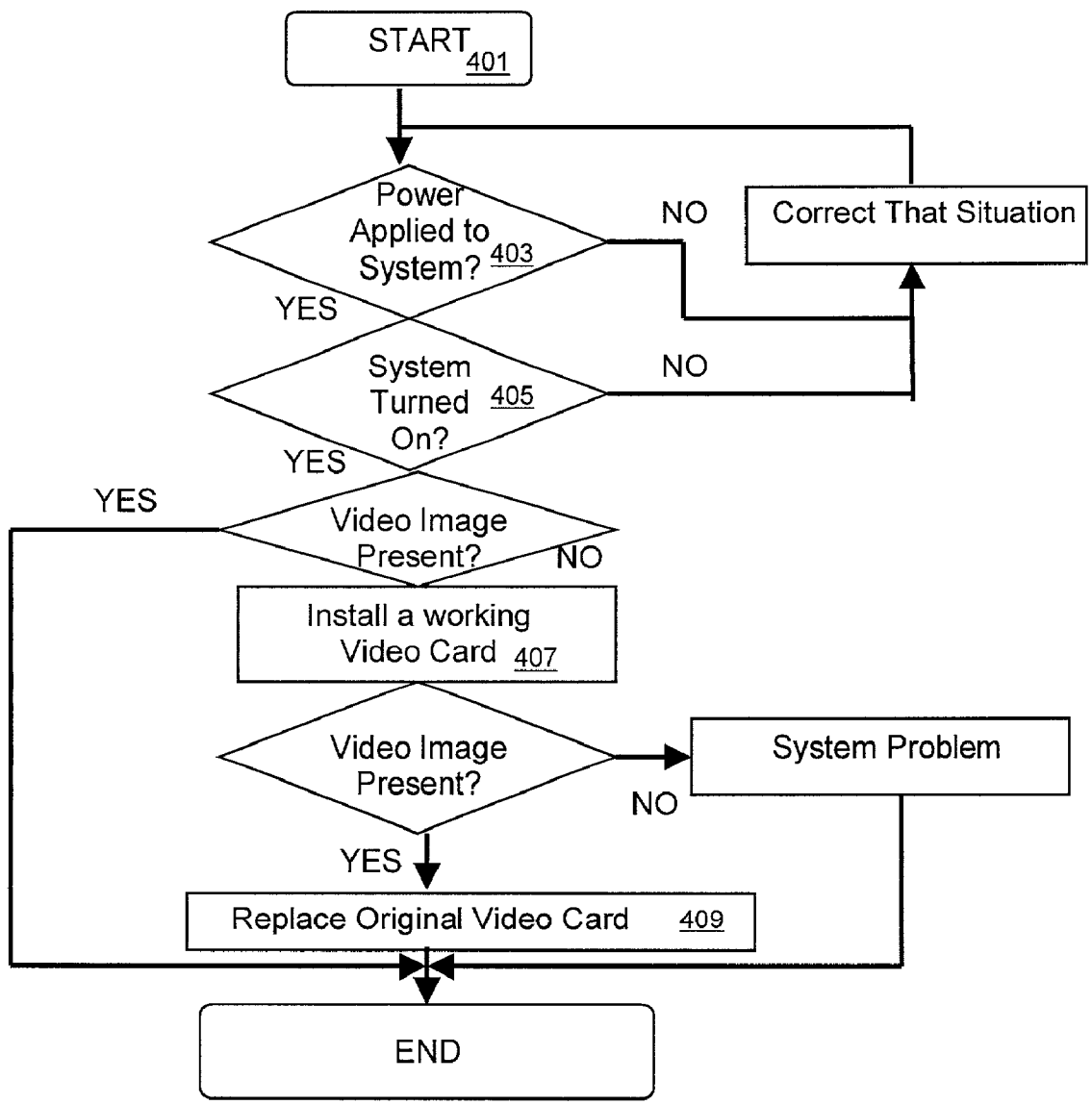
FIG. 4 is a flowchart outlining the operational steps of a diagnostic procedure.

FIG. 4 shows a diagnostic procedure 400. The diagnostic procedure is executed when the operator in method 300 decides that the video display device functions properly or if the diagnostic procedure is automatically initiated after the video pattern test. If not already connected, the end user connects the video display device to a system, e.g., a personal computer. The end user is then instructed to check whether the power is connected (403) and whether the system is turned on (405). If the answer to each of these steps is yes, but there is still no video image on the video display device, the end user is instructed to replace (407) the existing video graphic card with a video graphic card that is known to be working. If the video image then appears, this result suggests that the original video graphic card is not working and the end user preferably replaces (409) the original video graphic card. If the video image still does not appear even after the installation of a working video graphic card, this result suggests that the problem is located in other parts of the system, and that the end user is directed to send the system back to a service center for repair or replacement.

In another embodiment, the testing process may be performed by a technician at a retail outlet either as a quality check for the inventory, or as a prescreen for returned video display devices before sending them to the service center for repair.

In yet another embodiment, the testing process may be initiated by an end user in order to set up, calibrate, or evaluate a self-testing video display device at the user's location.

Although preferred embodiments and their advantages have been described in detail, various changes, substitutions and alterations can be made herein without departing from the spirit and scope of the testing apparatus and process as defined by the appended claims and their equivalents.

What is claimed is:

1. A method of testing a video display device at a remote site using internally generated test patterns, said method comprises:
   receiving a request for service on a video display device from an end user at a remote site;
   providing an access code to the end user at the remote site to initiate a video display test on the video display device using information stored inside the video display device;
   receiving reports from the end user at the remote site; and
   diagnosing on a functionality of the video display device based on the reports received from the end user.

2. The method of claim 1, wherein the video display device is connected to a system, further comprising:
   initiating a diagnostic procedure for detecting malfunction occurred outside the video display device.

3. A method for testing a video display device using internally generated test patterns, the method comprising:
   contacting a service center to obtain a test code,
   entering the test code from a keypad on a video display device to initiate a visual test that displays a plurality of video display test patterns on a video display screen using information stored inside the video display device;
   examining each video display test pattern to generate an evaluation;
   reporting the evaluation to the service center; and
   receiving a diagnosis from the service center.

4. The method of claim 3, further comprising:
   adjusting the video display device based on the diagnosis.

5. The method of claim 3, wherein the video display device is connected to a system, further comprising
   executing a diagnostic procedure to locate a malfunctioned component in the system.

6. A self-testing video display device, comprising:
   a keypad;
   a video display screen;
   a memory that stores information for a video display test program;
   a processor that extracts the information for video display test program from the memory, converts the information into video display test signals, and executes the video display test program, wherein the information for the video display test program comprises at least one test pattern and a description on how to properly examine the at least one test pattern, and the description is displayed on the video display screen to instruct a user on how to properly examine the at least one test pattern when the at least one pattern is displayed on the video display test screen;
   a controller that sends the video display test signals in a proper format to the video display screen.

7. The self-testing video display device according to claim 6, further comprising an application specific integrated circuit (ASIC), wherein the memory, processor and controller are located on the ASIC.

8. The self-testing video display device according to claim 7, further comprising a video processing unit, wherein the ASIC and the connector are located in the video processing unit.

9. The self-testing video display device according to claim 6, wherein the the keypad is located on a surface of the video display device.

10. The self-testing video display device according to claim 6, further comprising a connector that delivers an input signal to the processor.

11. The self-testing video display device according to claim 6, wherein the memory is chosen from a list consisting of ROM, DRAM, SRAM, and VRAM.

12. The self-testing video display device according to claim 6, wherein the information for the video display test program further comprises information for a diagnostic procedure.

13. The self-testing video display device according to claim 6, wherein the video display screen is a liquid crystal display screen, an organic light emitting display screen, a fluorescent display screen, or a plasma display screen.

14. The self-testing video display device according to claim 6, wherein the processor extracts the information for the video display test program in response to a code entered by a user using the keypad.

15. The self-testing video display device according to claim 6, wherein the processor in the video display device extracts the information for the video display test program from the memory in the video display device and executes the video display test program such that the video display device need not be connected to a computer system to execute the test program.

16. A video display device, comprising:
data entry means;
means for storing information for a video display test program;
means for determining if an access code entered using the data entry means is valid; and
means for executing the video display test program in response to determining that the access code is valid.

17. The video display device according to claim 16, further comprising means for receiving the code as an input signal.

18. The video display device according to claim 16, further comprising means for retrieving the code from a remote location.

19. The video display device according to claim 16, further comprising means for retrieving a diagnostic procedure from a remote location.

20. The video display device according to claim 19, further comprising means for reporting results of the diagnostic procedure to the remote location.

21. The video display device according to claim 16, further comprising means for storing a plurality of valid access codes.

* * * * *